United States Patent
Burstein et al.

(10) Patent No.: US 6,366,759 B1
(45) Date of Patent: *Apr. 2, 2002

(54) SYSTEM AND METHOD FOR COMPUTER-BASED AUTOMATIC ESSAY SCORING

(75) Inventors: Jill C. Burstein, Princeton, NJ (US); Lisa Braden-Harder, Reston, VA (US); Martin S. Chodorow, New York, NY (US); Bruce A. Kaplan, Lawrenceville, NJ (US); Karen Kukich, Annandale, NJ (US); Chi Lu, Princeton, NJ (US); Donald A. Rock, Lawrenceville, NJ (US); Susanne Wolff, New York, NY (US)

(73) Assignee: Educational Testing Service, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/693,210

(22) Filed: Oct. 20, 2000

Related U.S. Application Data

(63) Continuation of application No. 09/120,427, filed on Jul. 22, 1998.
(60) Provisional application No. 60/053,375, filed on Jul. 22, 1997.

(51) Int. Cl.[7] ................................................. G09B 7/00
(52) U.S. Cl. ........................ 434/353; 434/354; 434/322; 434/350; 434/363; 382/321; 704/4; 704/5; 704/6
(58) Field of Search ................................. 434/353, 354, 434/322, 350, 363; 382/321; 704/4, 6, 5

(56) References Cited

U.S. PATENT DOCUMENTS 4,958,284 A * 9/1990 Bishop et al. .......... 434/353 X
4,978,305 A * 12/1990 Kraft ..................... 434/353 X
5,259,766 A * 11/1993 Sack et al. .............. 434/362 X
6,115,683 A * 9/2000 Burstein et al. ............ 704/1 X
6,181,909 B1 * 1/2001 Burstein et al. ........ 434/353 X

OTHER PUBLICATIONS

Burstein et al., "Using Lexical Semantic Techniques to Classify Free–Responses", Jun. 1996, pp. 20–29.
Burstein et al., "Final Report for Automatic Scoring of Advanced Placement Biology Essays Submitted to Advanced Placement", Oct. 28, 1996, pp. 1–26.
Kaplan et al., "Evaluating a Prototype Essay Scoring Procedure Using Off–the–Shelf Software", Research Report, ETS, Princeton, NJ, Jul. 1995, pp. 1–78.

(List continued on next page.)

*Primary Examiner*—Valencia Martin-Wallace
*Assistant Examiner*—Chanda Harris
(74) *Attorney, Agent, or Firm*—Woodcock Washburn LLP

(57) ABSTRACT

A method of grading an essay using an automated essay scoring system is provided. The method comprises the automated steps of (a) parsing the essay to produce parsed text, wherein the parsed text is a syntactic representation of the essay, (b) using the parsed text to create a vector of syntactic features derived from the essay, (c) using the parsed text to create a vector of rhetorical features derived from the essay, (d) creating a first score feature derived from the essay, (e) creating a second score feature derived from the essay, and (f) processing the vector of syntactic features, the vector of rhetorical features, the first score feature, and the second score feature to generate a score for the essay. The essay scoring system comprises a Syntactic Feature Analysis program which creates a vector of syntactic features of the electronic essay text, a Rhetorical Feature Analysis program which creates a vector of rhetorical features of the electronic essay text, an EssayContent program which creates a first Essay Score Feature, an ArgContent program which creates a second Essay Score Feature, and a scoring engine which generates a final score for the essay from the vector of syntactic features, the vector of rhetorical features, the first score feature, and the second score feature.

17 Claims, 1 Drawing Sheet

OTHER PUBLICATIONS

Kernighan et al., *The C Porgramming Language*, 2$^{nd}$ Ed., Prentice Hall, Englewood Cliffs, NJ, pp. 139, 143, and 144.

Page, "The Classroom Challenge and Write America!", Handout for NCARE 1996 Annual Meeting, Session I, Chapel Hill, NC, Feb. 13, 1996, pp. 1–3.

Page et al., "Construct Validity in the Computer Grading of Essays", Handout for American Psychological Association, New York, NY, Aug. 13, 1996, pp. 1–3.

Page, "Grading Essays By Computer: Why the Controversy?", Handout for NCME, Invited Symposium, New York, NY, Apr. 11, 1996, pp. 1–3.

Page, "Computer Grading of Student Prose, Using Modern Concepts and Software", *J. Experimental Education*, 1994, vol. 62, No. 2, pp. 127–142.

Page et al., "The Computer Moves into Essay Grading", *Phi Delta Kappan*, Mar. 1995, pp. 561–565.

Tria Systems, Inc., An Analysis of IntelliMetric™ Performance: Jul. 1996 GMAT Analytic Writing Topics, Oct. 31, 1996, pp. 1–8.

Page et al., "Computer Grading of Essay Traits in Student Writing", Handout for NCME, Invited Symposium, New York, NY, Apr. 11, 1996, pp. 1–8.

Page et al., "Computer Grading of Essay Traits in Student Writing", *DRAFT* Handout for NCME, Invited Symposium, New York, NY, Apr. 11, 1996, pp. 1–8.

Cohen, R., "A Computational Theory of the Function of Clue Works in Argument Understanding", 10$^{th}$ International Conference on Computational Linguistics, 22$^{nd}$ Annual Meeting of the Association for Computational Linguistics, Stanford University, California, Jul. 2–6, 1984, pp. 251–258.

Hirschberg et al., "Empirical Studies on the Disambiguation of Cue Phrases", *Computational Linguistics*, 1993, vol. 19, No. 3, pp. 501–530.

Hovy et al., "Employing Knowledge Resources in a New Text Planner Architecture", in *Aspects of Automatic Natural Language Generation*, Dale et al. (eds.), 6$^{th}$ International Workshop on Natural Language Generation, Italy, Apr. 5–7, 1992, pp. 57–72.

Mann, W.C. et al., *Rhetorical Structure Theory: Toward a Functional Theory of Text Organization*, 1988, vol. 8, No. 3, pp. 243–281.

Quirk et al., *A Comprehensive Grammar of the English Language*, Longman (ed.), New York, 1985.

Sidner et al., "Focusing in the Comprehension of Definite Anaphora", in *Readings in Natural Language Processing*, Grosz et al. (eds.), Morgan Kaufmann Publishers, Los Altos, CA, 1986, pp. 363–394.

Vander Linden et al., "Expressing Rhetorical Relations in Instructional Text: A Case Study in Purpose Relation", *Computational Linguistics*, 1995, vol. 21, No. 1, pp. 29–57.

Breland, H.M. et al. (eds.), Factors in Performance on Brief, Impromptu Essay Examinations, College Board Report No. 95–4 and ETS Research Report 95–41, College Entrance Examination Board, New York, NY, 1996, pp. 1–36.

Burstein, J. et al., "An Automatic Scoring System for Advanced Placement Biology Essays", in Proceedings of the Fifth Conference on Applied Natural Language Processing, Association for Computational Linguistics, Washington, D.C., 1997, pp. 174–181.

Elliot, S. et al., Computerized Scoring of Open–Ended Bar Examination Questions, Paper presented at the Annual Conference of the American Educational Research Association, Chicago, 1997, pp. 1–11.

Hech–Nielson, R., *Neurocomputing*, Addison–wesley Company, Inc., 1989.

Kaplan, R. et al., "Scoring Essays Automatically Using Essay Features", GRE® Research, GRE Board Professional Report No. 94–21P, ETS Research Report 98–39, Aug. 1998, pp. 1–12.

Nolan, J., "The Architecture of a Hybrid Knowledge–Based System for Evaluating Writing Samples", in *EXPERSYS–97 Artificial Intelligence Application*.

* cited by examiner

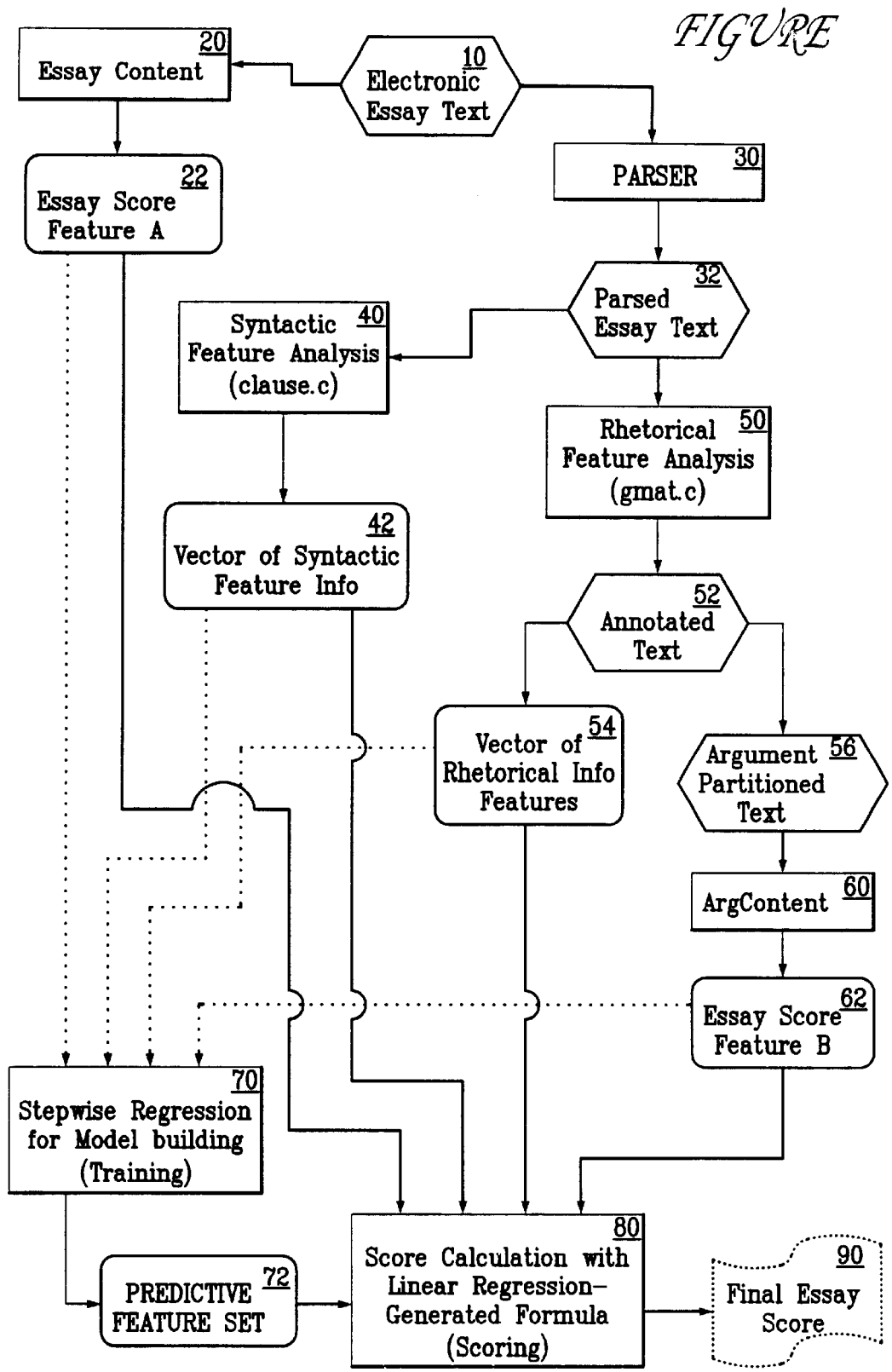
FIGURE

SYSTEM AND METHOD FOR COMPUTER-BASED AUTOMATIC ESSAY SCORING

CROSS REFERENCE TO RELATED APPLICATIONS

This Application is a continuation of U.S. Provisional Application Serial No. 09/120,427 filed Jul. 22, 1998, entitled 'System and Method for Computer-Based Automatic Essay Scoring', the contents of which are hereby incorporated by reference in their entirety.

This application is related to U.S. Provisional Patent Application Serial No. 60/053,375, filed Jul. 22, 1997, entitled "Computer Analysis of Essay Content for Automated Score Prediction," the contents of which are hereby incorporated by reference in their entirety.

FIELD OF THE INVENTION

This invention generally relates to the field of computer-based test scoring systems, and more particularly, to automatic essay scoring systems.

BACKGROUND OF THE INVENTION

For many years, standardized tests have been administered to examinees for various reasons such as for educational testing or for evaluating particular skills. For instance, academic skills tests, e.g., SATs, LSATs, GMATs, etc., are typically administered to a large number of students. Results of these tests are used by colleges, universities and other educational institutions as a factor in determining whether an examinee should be admitted to study at that particular institution. Other standardized testing is carried out to determine whether or not an individual has attained a specified level of knowledge, or mastery, of a given subject. Such testing is referred to as mastery testing, e.g., achievement tests offered to students in a variety of subjects, and the results are used for college credit in such subjects.

Many of these standardized tests have essay sections. These essay portions of an exam typically require human graders to read the wholly unique essay answers. As one might expect, essay grading requires a significant number of work-hours, especially compared to machine-graded multiple choice questions. Essay questions, however, often provide a more well-rounded assessment of a particular test taker's abilities. It is, therefore, desirable to provide a computer-based automatic scoring system.

Typically, graders grade essays based on scoring rubrics, i.e., descriptions of essay quality or writing competency at each score level. For example, the scoring guide for a scoring range from 0 to 6 specifically states that a "6" essay "develops ideas cogently, organizes them logically, and connects them with clear transitions." A human grader simply tries to evaluate the essay based on descriptions in the scoring rubric. This technique, however, is subjective and can lead to inconsistent results. It is, therefore, desirable to provide an automatic scoring system that is accurate, reliable and yields consistent results.

Literature in the field of discourse analysis points out that lexical (word) and structural (syntactic) features of discourse can be identified (Mann, William C. and Sandra A. Thompson (1988): *Rhetorical Structure Theory: Toward a functional theory of text organization,* Text 8(3), 243–281) and represented in a machine, for computer-based analysis (Cohen, Robin: *A computational theory of the function of clue words in argument understanding,* in "Proceedings of 1984 International Computational Linguistics Conference." California, 251–255 (1984); Hovy, Eduard, Julia Lavid, Elisabeth Maier, Vibhu Nettal and Cecile Paris: *Employing Knowledge Resources* in a *New Text Planner Architecture,* in "Aspects of Automated NL Generation," Dale, Hony, Rosner and Stoch (Eds), Springer-Veriag Lecture Notes in AI no. 587, 57–72 (1992); Hirschberg, Julia and Diane Litman: *Empirical Studies on the Disambiguation of Cue Phrases,* in "Computational Linguistics" (1993), 501–530 (1993); and Vander Linden, Keith and James H. Martin: *Expressing Rhetorical Relations in Instructional,* Text: A Case Study in Purpose Relation in "Computational Linguistics" 21(1), 29–57 (1995)).

Previous work in automated essay scoring, such as by Page, E. B. and N. Petersen: *The computer moves into essay grading: updating the ancient test.* Phi Delta Kappa; March, 561–565 (1995), reports that predicting essay scores using surface feature variables, e.g., the fourth root of the length of an essay, shows correlations as high as 0.78 between a single human rater (grader) score and machine-based scores for a set of PRAXIS essays. Using grammar checker variables in addition to word counts based on essay length yields up to 99% agreement between machine-based scores that match human rater scores within 1 point on a 6-point holistic rubric. These results using grammar checker variables have added value since grammar checker variables may have substantive information about writing competency that might reflect rubric criteria such as, essay is free from errors in mechanics, usage and sentence structure.

SUMMARY OF THE INVENTION

A method of grading an essay using an automated essay scoring system is provided. The method comprises the steps of (a) parsing the essay to produce parsed text, wherein the parsed text is a syntactic representation of the essay, (b) using the parsed text and discourse-based heuristics to create a vector of syntactic features derived from the essay, (c) using the parsed text to create a vector of rhetorical features derived from the essay, (d) creating a first score feature derived from the essay, (e) creating a second score feature derived from the essay, and (f) processing the vector of syntactic features, the vector of rhetorical features, the first score feature, and the second score feature to generate a score for the essay.

In a preferred embodiment, the method further comprises the step of (g) creating a predictive feature set for the test question, where the predictive feature set represents a model feature set for the test question covering a complete range of scores of a scoring guide for the test question, wherein in step (f), a scoring formula may be derived from the predictive feature set and the score for the essay may be assigned based on the scoring guide. Preferably, a batch of original essays, which are essays of a known score to a test question, are used in accordance with the model feature of the invention to create the predictive feature set. Creating the predictive feature set in this manner comprises the steps of repeating steps (a) through (f) for the batch of original essays and processing the vector of syntactic features, the vector of rhetorical features, the first score feature, and the second score feature for each original essay using a linear regression to generate the predictive feature set for the test question.

Preferably, each essay is already in the form of electronic essay text as in the case with on-line essay testing. If this is not the case, however, then the method of the present invention further comprises the step of converting the essay into the form of electronic essay text.

A computer-based automated essay scoring system for grading an essay also is provided. The essay scoring system comprises a Syntactic Feature Analysis program which creates a vector of syntactic features of the electronic essay text, a Rhetorical Feature Analysis program which creates a vector of rhetorical features of the electronic essay text, an EssayContent program which creates a first Essay Score Feature, an ArgContent program which creates a second Essay Score Feature, and a score generator which generates a final score for the essay from the vector of syntactic features, the vector of rhetorical features, the first score feature, and the second score feature.

In a preferred embodiment, the essay scoring system further comprising a parser for producing a syntactic representation of each essay for use by the Syntactic Feature Analysis program and the Rhetorical Feature Analysis program. In another preferred embodiment, the essay scoring system further comprising a Stepwise Linear Regression program which generates a predictive feature set representing a model feature set that is predictive of a range of scores for the test question which is provided to the scoring engine for use in assessing the final score for the essay.

BRIEF DESCRIPTION OF THE DRAWING

The present invention will be better understood, and its numerous objects and advantages will become more apparent, by reference to the following detailed description of the invention when taken in conjunction with the following drawing, of which:

FIG. 1 is a functional flow diagram for a preferred embodiment of the e-rater system of the present invention.

DETAILED DESCRIPTION OF THE PREFERRED EMBODIMENTS

A computer-based system designed to automatically score essay responses is described herein. Solely for illustrative purposes, the following description of the invention focuses on the standardized GMAT Analytical Writing Assessments: (a) *Analysis of an Argument* (Argument essays) and (b) *Analysis of an Issue* (Issue essays) item types, examples of which are shown in Appendix A1 and Appendix A2, respectively. The system of the present invention, named e-rater as in Electronic Essay Rater, automatically analyzes several features of an essay and scores the essay based on the features of writing as specified in holistic scoring rubrics (descriptions of essay quality or writing competency at each score level of a 6-point scoring guide used by several standardized exams such as the GMAT, with 6 being the best score).

The present system automatically rates essays using features that reflect the 6-point holistic rubrics used by human raters to assign scores to essay responses. E-rater is completely automated so that it can be quickly moved into an operationally-ready mode and uses rubric-based features to evaluate essay responses, such as rhetorical structure, vocabulary and syntactic features.

E-rater uses a hybrid feature methodology. It incorporates several variables that are derived statistically, or extracted through Natural Language Processing (NLP) techniques. As described in this specification, e-rater uses four sets of critical feature variables to build the final linear regression model used for predicting scores, referred to as predictor variables. All predictor variables and counts of predictor variables are automatically generated by several independent computer programs. For argument and issue essay types, all relevant information about the variables are introduced into a stepwise linear regression in order to evaluate the predictive variables, i.e., the variables that account for most of the variation between essays at different score intervals. Variables included in e-rater's final score prediction model for argument and issue essays are: (a) structural features, (b) rhetorical structure analyses, (c) content vector analyses, and (d) content vector analyses by argument (argument vector analyses). A conceptual rationale and a description of how each variable is generated is described below.

A. Structural Features

The scoring guides for both argument and issue essays indicate that one feature used to rate an essay is "syntactic variety." Syntactic structures in essays can be identified using NLP techniques. In the present invention, all sentences in the essay responses are parsed. The parser takes a sentence string as input and returns a syntactically analyzed version of a sentence, as illustrated in Table 1. Examination of syntactic structures in an essay response yields information about the "syntactic variety" in the essay. For example, information about what types of clauses or verb types can reveal information about "syntactic variety." In Table 1, DEC is a declarative sentence, NP is a Noun phrase, AJP is an adjective phrase, ADJ is an adjective, NOUN is a noun, PP is a prepositional phrase, PREP is a preposition, INFCL is an infinitive clause, DETP is a determiner phrase, and CHAR is a character.

TABLE 1

Syntactic Parse for a Sentence from an Issue Essay

Young people often express discontent with taxation levels to support the aged.

| | | | | |
|---|---|---|---|---|
| DEC1 | 1NP1 | AJP1 | ADJ1* | "Young" |
| | | | NOUN1* | "people" |
| | | AVPl | ADV1* | "often" |
| | | | VERB1* | "express" |
| | | NP2 | NOUN2* | "discontent" |
| | PP1 | PP2 | PREP1* | "with" |
| | | NP3 | NOUN3* | "taxation" |
| | | | NOUN4* | "levels" |
| | INFCL1 | INFTO1 | PREP2* | "to" |
| | | | VERB2* | "support" |
| | NP4 | DETP1 | ADJ2* | "the" |
| | | | NOUN5* | "aged" |
| | | | CHAR1 | "." |

A program for examining syntactic structure was run on approximately 1,300 essays. The program counted the number of complement clauses, subordinate clauses, infinitive clauses, relative clauses and the subjunctive modal auxiliary verbs such as would, could, should, might and may, for each sentence in an essay. A linear regression analysis then selected the variables in Table 2 as predictive variables for the final score prediction model. By using these predictive variables, a vector of syntactic counts (42 in FIG. 1) for each essay is generated and is used by e-rater is the final scoring.

TABLE 2

Grammatical Structural Variables Used in e-rater to Predict Essay Scores

| | |
|---|---|
| Argument Essays | Total Number of Modal Auxiliary Verbs |
| | Ratio of Complement Clauses Per Sentence |
| Issue Essays | Total Number of Infinitive Clauses |
| | Total Number of Modal Auxiliary Verbs/Paragraph |

B. Rhetorical Structure Analysis

In both argument and issue essays, the scoring guides indicate that an essay will receive a score based on the examinee's demonstration of a well-developed essay. For the argument essay, the scoring guide states specifically that a "6" essay "develops ideas cogently, organizes them logically, and connects them with clear transitions." For the issue essay, a "6" essay "develops a position on the issue with insightful reasons . . . " and the essay "is clearly well-organized."

Language in holistic scoring guides, such as "cogent", "logical," "insightful," and "well-organized" have "fuzzy" meaning because they are based on imprecise observation. Methods of "fuzzy logic" can be used to automatically assign these kinds of "fuzzy" classifications to essays. This part of the present invention identifies the organization of an essay through automated analysis of the rhetorical (argument) structure of the essay.

The linguistic literature about rhetorical structure (Cohen (1984), Hovy et al. (1992), Hirschberg and Litman (1993), and Vander Linden and Martin (1995)) point out that rhetorical (or discourse) structure can be characterized by words, terms and syntactic structures. For instance, words and terms that provide "clues" about where a new argument starts, or how it is being developed are discussed in the literature as "clue words."

Conjunctive relations from Quirk, Randolph, Sidney Greenbaum, Geoffrey Leech, and Jan Svartik: *A Comprehensive Grammar of the English Language,* Longman, New York (1985) including terms such as, "In summary" and "In conclusion," are considered to be clue words and are classified as conjuncts used for summarizing. Clue words such as "perhaps," and "possibly" are considered to be "belief" words used by a writer to express a belief in developing an argument in the essay. Words like "this" and "these" may often be used to flag that the writer has not changed topics (Sidner, Candace: 1986, *Focusing in the Comprehension of Definite Anaphora,* in "Readings in Natural Language Processing," Barbara Grosz, Karen Sparck Jones, and Bonnie Lynn Webber (Eds.), Morgan Kaufmann Publishers, Los Altos, Calif., 363–394). It also was observed that in certain discourse contexts, structures such as infinitive clauses (INFCL) mark the beginning of a new argument, e.g., "To experimentally support their argument, Big Boards (INFCL) would have to do two things."

One part of the present invention is an automated argument partitioning and annotation program (APA). APA outputs a file for each essay after it is partitioned into argument units. In addition, APA outputs a second file in which each sentence in an essay is annotated with word, term or structure classifications that denote argument structure. A specialized dictionary (lexicon) is used by APA to identify relevant clue words and terms. The lexicon used by e-rater is displayed in Appendix B1.

APA's heuristics select the dictionary-based clue words, terms, and non-lexical structures. Descriptions of the rules used by APA appear in Appendix B2. The rules that APA uses to partition and annotate arguments specify syntactic structure and the syntactic contexts in which clue words contribute to argument structure. APA uses parsed essays to identify syntactic structures in essays. Essays have been syntactically parsed and each sentence in the essay has a syntactic analysis. Table 3 illustrates original essay text and the text output by APA with corresponding argument partitioning annotations, where wording in the argument-unit annotations has been revised for comprehensibility.

TABLE 3

Example of Automated Argument
Partitions and Annotations (APA)

| Essay Text | Argument Partitioned/Annotated Essay Text |
| --- | --- |
| ". . . Another problem with the argument is found in the evidence used to support it. Big Boards takes responsibility for increasing River City's awareness of the marathon runner over the three-month period by putting her name on billboards, but they also stated that there was "extensive national publicity" of the woman during that time. The 30% increase in awareness of this woman could have been a result of the national publicity. Big Boards did not necessarily have anything to do with River City learning the woman's name - they may have learned it from TV or magazines or newspapers . . ." | Another problem with the argument is found in the evidence used to support it.<br><br>>Start Argument at Parallel Word: Another<br><br>Big Boards takes responsibility for increasing River City's awareness of the marathon runner over the three-month period by putting her name an billboards, but they also stated that therewas "extensivenationalpublicity"ofthe womanduringthattime.<br><br>>Argument Development at Contrast Word: but<br>>Argument Development at Complement Clause: that...<br><br>The 30% increase in awareness af this woman could have been a result of the national publicity.<br><br>>Speculation at Auxiliary Word: could<br><br>Big Boards did not necessarily have anything to do with River City learning the woman's name - they may have learned it. |

Table 4 shows the rhetorical variables used by e-rater for predicting scores. By using these predictive variables, a vector of rhetorical feature counts (54 in FIG. 1) for each essay is generated and used by e-rater in final scoring.

TABLE 4

Rhetorical Structure Variables Used to Predict
Scores for Issue and Argument Essays

| | |
| --- | --- |
| Argument Essays | Total Occurrences of independent Arguments in the Final Paragraph of the Essay<br>Total Occurrences of Subjunctive Modal Verbs in the Final Paragraph of the Essay<br>Total Occurrences of Parallel Words that Begin an Independent Argument<br>Total Occurrences of Argument Development Using Belief Words |
| Issue Essays | Total Occurrences of Arguments Starting With a Summary Phrase<br>Total Occurrences of Arguments Starting With an Infinitive Clause<br>Total Occurrences of Arguments Starting With a Subordinate Clause<br>Total Occurrences of Argument Development Using an Infinitive Clause<br>Total Occurrences of Argument Development Using a Belief Word<br>Total Number of Independent Arguments in the Body of the Essay, Excluding The First And Final Arguments/Paragraph |

C. Content Vector Analysis

The scoring rubric suggests that certain ideas are expected in an essay by stating that the essay "effectively supports the main points of the critique" for argument essays and "explores ideas and develops a position on the issue with insightful reasons and/or persuasive examples" for the issue essays. Content vector (CV) analysis is a statistical weighting technique used to identify relationships between words and documents. With regard to the approximate specifications in the rubric about essay content, CV analysis can be used to identify vocabulary (or content words) in essays that appear to contribute to essay score.

Assigning one of six scores to a GMAT essay is a standard type of classification problem. Statistical approaches to classification define each class (score) by the distribution of characteristics found in labeled training examples. Then, each test essay is analyzed, and its distribution is compared to that of the known classes. The class which best matches the test essay is selected.

For text, the characteristics may be physical (the number or length of words, sentences, paragraphs, or documents), lexical (the particular words that occur), syntactic (the form, complexity, or variety of constructions), rhetorical (the number or type of arguments), logical (the propositional structure of the sentences), or a combination of these.

Standard CV analysis characterizes each text document (essay) at the lexical (word) level. The document is transformed into a list of word-frequency pairs, where frequency is simply the number of times that the word appeared in the document. This list constitutes a vector which represents the lexical content of the document. Morphological analysis can optionally be used to combine the counts of inflectionally-related forms so that "walks," "walked," and "walking" all contribute to the frequency of their stem, "walk." In this way, a degree of generalization is realized across morphological variants. To represent a whole class of documents, such as a score level for a set of essays, the documents in the class are concatenated and a single vector is generated to represent the class.

CV analysis refines this basic approach by assigning a weight to each word in the vector based on the word's salience. Salience is determined by the relative frequency of the word in the document (or class) and by the inverse of its frequency over all documents. For example, "the" may be very frequent in a given document, but its salience will be low because it appears in all documents. If the word "pterodactyl" appears even a few times in a document, it will likely have high salience because there are relatively few documents that contain this word.

A test essay is compared to a class by computing a cosine correlation between their weighted vectors. The cosine value is determined by the following equation:

$$\cos = \Sigma(a_i * b_i)/sqrt(\Sigma(a_i^2) * \Sigma(b_i^2))$$

where $a_i$ is the frequency of word "i" in document "a" and $b_i$ is the frequency of word "i" in document "b." The larger the value of the correlation, the closer the test essay is to the class. The class which is closest to the test essay is selected and designated "Essay Score Feature A" (22 in FIG. 1). These steps are summarized below.

Vector construction for each document (or class):
Extract words from document (or combined documents)
Apply morphological analysis (optional)
Construct frequency vector
Assign weights to words to form weighted vector
Compute cosine correlation between test essay vector and the vector of each class
Select class with highest correlation As discussed in the next section, CV analysis can also be applied to units of text smaller than essays. For example, it can be used to evaluate the rhetorical arguments within an essay. In this case, each argument is treated like a mini-document and is compared to the classes independently of the other arguments. The result is a vector of classes (scores), one for each argument in the essay.

E-rater uses a CV analysis computer program which automatically predicts scores for both argument and issue essays. The scores assigned by the CV analysis program are used as a predictor variable for the set of argument essays.

D. Argument-Content Vector Analysis

An important goal of this invention is to be able to predict essay scores based on "what the writer says." CV analysis, as it is used above, identifies word associations over the essay as a whole. It looks at words randomly in the essay. Although this tells the reader something about possible essay content, it is important to capture words in a more structured way, so that topic may be identified using closely clustered word groupings.

The scoring rubric specifies that relevant essay content (or relevant words used in an essay) should be well organized and should address relevant content. Therefore, a revised version of the content vector analysis program was implemented and run on the "argument partitioned" training essays for argument and issue essays.

Another content similarity measure, ArgContent, is computed separately for each argument in the test essay and is based on the kind of term weighting used in information retrieval. For this purpose, the word frequency vectors for the six score categories, described above, are converted to vectors of word weights. The weight for word "i" in score category "s" is:

$$w_{i,s} = (\text{freq}_{i,s}/\text{max}_{13}\ \text{freq}_s) * \log(n\_\text{essays}_{total}/n\_\text{essays}_i)$$

where $\text{freq}_{i,s}$ is the frequency of word "i" in category "s," $\text{max\_freq}_s$ is the frequency of the most frequent word in category "s" (after a stop list of words has been removed), $n\_\text{essays}_{total}$ is the total number of training essays across all six categories, and $n\_\text{essays}_i$ is the number of training essays containing word "i."

The first part of the weight formula represents the prominence of word "i" in the score category, and the second part is the log of the word's inverse document frequency (IDF). For each argument "a" in the test essay, a vector of word weights is also constructed. The weight for word "i" in argument "a" is:

$$W_{i,a} = (\text{freq}_{i,a}/\text{max\_freq}_a) * \log(n\_\text{essays}_{total}/n\_\text{essays}_i)$$

where $\text{freq}_{i,a}$ is the frequency of word "i" in argument "a," and $\text{max\_freq}_a$ is the frequency of the most frequency word in "a" (once again, after a stop list of words has been removed). Each argument (as it has been partitioned) is evaluated by computing cosine correlations between its weighted vector and those of the six score categories, and the most similar category is assigned to the argument. As a result of this analysis, e-rater has a set of scores (one per argument) for each test essay. The final score is then calculated as an adjusted mean of the set of scores, represented as ArgContent:

$$\text{ArgContent} = ((\text{arg\_scores} + n\_\text{args})/(n\_\text{args} + 1)$$

This final score output is designated "Essay Score Feature B" (62 in FIG. 1).

E. The e-rater System Overview

FIG. 1 shows a functional flow diagram for a preferred embodiment of the e-rater system of the present invention. The first step in automatically scoring an essay is creating a model feature set, i.e., a model feature set used to predict scores at each score point of the scoring rubric. The system starts with a batch of approximately 250–300 original electronic essay text responses (essays already having a known score). Each original electronic essay text 10 is evaluated by EssayContent 20 to perform Content Vector Analysis (as described in Section C above) and to generate "Essay Score Feature A" and is also parsed by the parser 30 to produce a "syntactic" representation of each essay response, denoted as parsed essay text 32.

Syntactic Feature Analysis 40 (program clause.c) then processes the parsed essay text 32 to extract syntactic information (as described above in Section A entitled "Structural Features") and creates a vector of syntactic feature counts 42 for each syntatic feature considered by e-rater. Rhetorical Feature Analysis 50 (program gmat.c) also processes the parsed essay text 32 (as described above in Section B entitled "Rhetorical Structure Analysis") to generate annotated text 52, which includes a vector of rhetorical feature counts 54 and text partitioned into independent arguments 56. This argument partitioned text 56 is then evaluated by ArgContent to perform Argument-Content Vector Analysis (Section D above) to produce "Essay Score Feature B" 62.

The vector of syntactic features 42, the vector of rhetorical features 54, Essay Score Feature A 22, and Essay Score Feature B 62 are then fed (depicted by the phantom arrows) into a stepwise linear regression 70, from which a "weighted" predictive feature set 72 is generated for each test question using the batch of sample data. The set of weighted predictive features define the model feature set for each test question.

The steps just described above up to the linear regression 70 are then performed for a score to be predicted for each actual essay response. The vector of syntactic features 42, the vector of rhetorical features 54, Essay Score Feature A 22, and Essay Score Feature B 62 for each response are then fed (depicted by the solid arrows) into the score calculation program 80 associated with the model answer for the test question with which the essay is associated and a Final Score 90 between 0 and 6 is generated.

It will be appreciated by those skilled in the art that the foregoing has set forth the presently preferred embodiment of the invention and an illustrative embodiment of the invention, but that numerous alternative embodiments are possible without departing from the novel teachings of the invention. All such modifications are intended to be included within the scope of the appended claims.

APPENDIX A1: ANALYSIS OF AN ARGUMENT ITEM

Analysis of an Argument Item

Time—30 Minutes

Directions: In this section you will be asked to write a critique of the argument presented below. You are not being asked to present your own views on the subject.
Read the argument and the instructions that follow it, and then make any notes in your test booklet that will help you plan your response. Begin writing your response on the separate answer document. Make sure that you use the answer document that goes with this writing task.
The following is from a campaign by Big Boards, Inc., to convince companies in River City that their sales will increase if they use Big Boards billboards for advertising their locally manufacted products.

"The potential of Big Boards to increase sales of your products can be seen from an experiment we conducted last year.
We increased public awareness of the name of the current national women's marathon champion by publishing her picture and her name on billboards in River City for a period of three months. Before this time, although the champion had just won her title and was receiving extensive national publicity, only five percent of 15,000 randomly surveyed residents of River City could correctly name the champion when shown her picture; after the three-month advertising experiment, 35 percent of respondents from a second survey could supply her name."
Discuss how well reasoned you find this argument. In your discussion be sure to analyze the line of reasoning and the use of evidence in the argument. For example, you may need to consider what questionable assumptions underlie the thinking and what alternative explanations or counterexamples might weaken the conclusion. You can also discuss what sort of evidence would strengthen or refute the argument, what changes in the argument would make it more sound and persuasive, and what, if anything, would help you better evaluate its conclusion.

Notes

Use the space below or on the facing page to plan your response. Any writing on these pages will not be evaluated.

Stop

You Finish Before Time is Called, You May Check Your Work on This Section Only. Do Not Turn to Any Other Section in the Test

APPENDIX A2: ANALYSIS OF AN ISSUE ITEM

Analysis of an Issue

Time—30 Minutes

Directions: In this section you will need to analyze the issue presented below and explain your views on it. The question has no "correct" answer. Instead, you should consider various perspectives as you develop your own position on the issue.
Read the statement and the instructions that follow it, and then make any notes in your test booklet that will help you plan your response. Begin writing your response on the separate answer document. Make sure that you use the answer document that goes with this writing task.

"Everywhere, it seems, there are clear and positive signs that people are becoming more respectful of one another's differences."
In your opinion, how accurate is the view expressed above? Use reasons and/or examples from your own experience, observations, or reading to develop your position.

Notes

Use the space below or on the facing page to plan your response. Any writing on these pages will not be evaluated.

Stop

If You Finish Before Time is Called, You May Check Your Work on This Section Only. Do Not Turn to Any Other Section in the Test

---

Appendix B1: Lexicon (CLUELEX) used by e-rater argument content#ALTERNATIVE::.or, either
  argument development class#BELIEF_word:: certainly, clearly, obviously, plainly, possibly, perhaps, potentially, probably, fortunately, generally, maybe, presumably, unless, albeit, luckily, unluckily, normally, for sure, apparently, herein, likely, surely, ideally, undoubtedly, naturally
argument devlopment class#BELIEF_phrase:: for_certain, for_sure, of_course, to_some-extent, above_all, if only, in_order_to, in_order_for, so_that, so_as_to
argument initialization class#CLAIM_N:: argument, arguments, assumption, assumptions, claim, claims, issue, issues; evidence, evidences, idea, ideas, flaw, flaws, study, stuidies, point, points, position, positions, leap_of_logic, conclusion, conclusions, emission, generalization, indication, indications, deduction, passage, factor, factors, problem, problems, statement, statements, discussion, discussions, question, questions, example, examples, counterexample, counterexamples, reason, reasons
argument initialization class#CLAIM_phraseRO:: I, we
argument initialization class#CLAIM THAT:: that
argument development class#CONTRAST_word:: otherwise, conversely, however, nonetheless, though, yet, meanwhile, while, but, instead, although, still, notwithstanding, anyway, unlike
argument development class#CONTRAST_phrase:: on_the_contrary, in_contrast, by_comparison, in_any_case, at_any_rate, in_spite_of, rather_than, on_the_other-hand, even_wordhen, even_if, even_though, even_wordith, apart_from, instead_of
argument development class#DETAIL_word:: if, specifically, particutarly, when, namely
argument development class#DETAIL_phrase:: for_example, for_instance, e.g, in_this_case, in_that_case, such_that, as_well_as, in-that, such_as, about_how, in_addition, in_addition_to
argument development class#DISBELIEF_word:: unfortunately
argument development class#EVIDENCE_word:: since, because, actually
argument development class#EVIDENCE_phrase:: in_fact, after_all, as_a_matter_of_fact, because_of
argument development class#INFERENCE_word:: accordingly, consequently, hence, thus, ultimately, so, thereby, then, therefore, following, after, afterward, afterwards
argument development class#INFERENCE_phrase:: as_a_consequence, as_a_result, if_so, if_not, as_such, according_to, in_turn, right_after
argument initialization class#PARALLEL_word:: firstly, essentially, additionally, first, second, another, third, secondly, thirdly, fourth, next, finally, final last, lastly, moreover, too, also, likewise, similarly, initially, further, furhermore
argument initialization class#PARALLEL_phrase:: first_of all, in_the-first_place, for_one_thing, for_a_start, second_of_all, many_times, more_importantly, most_importantly
argument development class#REFORMULATION word:: alternatively
argument development class#REFORMULATION_phrase:: that_is, in_other words, i. e., briefly
argument development class#RHETORICAL word:: ?, suppose, supposedly, supposing
argument development class#RHETORICAL_phrase:: what if
argument initialization class#SUMMARY_word: altogether, overall
argument initialization class#SUMMARY_phrase:: all_in_all, in_conclusion, in_sum, in_summary, in_summation, in_short, on_the_whole
arg auxiliary_verb#SPECULATE_word::might, may, should, could, would
argument initialization class#TRANSITION_phrase::let us

---

Appendix B2: Rules Used By e-rater

"AFTER" RULE
  A. Extracts "after", "after", and "afterwards" if they occur sentence initially as conjunction.

II "ALSO" RULE
  A. Constrains argument extraction for "also", classified in the lexicon as arg-init#Parallel, and for additional adverbs classified as arg_dev#Belief such that all are extracted if they appear in sentence initial position or if they modify the main verb of the sentence (defined as the first verb that occurs in the second column of the parse tree).

III. LEXICALLY-BASED RULE FOR BEGINNING AN ARGUMENT
  a. Constrains the extraction of nouns and pronouns classified as arg-init#CLAIM words in the lexicon to main clause subject NPs and in sentences beginning with "There", to the position after a form of the verb "to be".

IV.
  a. Controls the extraction and labeling of Nouns in arg_init position that are modified by "this" or "these" that are labeled arg_dev#SAME_TOPIC when they occur in the second or later sentence of a paragraph.
  b. If "This", "These" or "It" occur as a pronoun in the first noun phrase of the parse tree of sentences that are not paragraph-initial, they are output with the label arg_dev#SANE_TOPIC. This label is generated dynamically. "This, "these" and "it" are not stored in the lexicon.

V. "BUT" RULE
  A. Extracts "but" if it is labeled as a conjunction.

VI. COMPLEMENT CLAUSE RULE
  A. Extracts complement clauses introduced by "that" as well as complement clauses that do not begin with "that."
  B. Labels complement clause as arg_init#CLAIM_THAT* when it is the first or only sentence of a paragraph, otherwise it is labeled as arg_dev#CLAIM_THAT*
  C. Extracts the conjunction "that" if it occurs in a complement clause, or a complement clause not introduced by "that" under the following conditions:
    1. the complement clause is not embedded in another COMPCL or SUBCL
    2. the complement clause is not further embedded than the third column of the parse tree VII. SUBORDINATE CLAUSE" RULE FOR BEGINNING AN ARGUMENT
  A. If the very first sentence of a paragraph begins with a subordinate clause, extract the noun or pronoun from the main clause NP and consider it to be the beginning of a new argument. The noun or pronoun extracted is labeled arg_init#D-SPECIFIC if it is not listed in the lexicon.

VIII. "FIRST" RULE
  A. Constains words listed in lexicon that are classified as arg_init#Parallel words.
  B. All words of this category in sentence initial position are exacted (cf ALSO RULE).
  C. If the word is not sentence-initial one of the following conditions must be satisfied.
    1. It must be in the first constituent of the parse tree, provided that the first consituent is not asbordite clause and that it is not further embedded in the parse tree than the third column.
    2. It must be the first NP following a sentence-initial adverb.
    3. If the first consistent is the pronoun "I" followed by a verb, then the "FIRST" item must be immediately following the verb.

IX. "FURTHER" RULE
  A. Extracts "further" "overall" or "altogether" if they occur sentence-initially and do not modify another constituent.

X. INFINITIVE CLAUSE RULE

A. Extracts an infinitival clause that is not further embedded than the third column of the parse tree and either follows or precedes the main verb of the sentence. The clause is not embedded in a subordinate clause or a complement clause. Infintival clauses that are extracted are labeled as arg__init#To-INFL if it is the first or only sentence of a paragraph, otherwise arg__dev#To__INFL.

XI. RULE FOR BEGINNING AN ARGUMENT AT A NEW PARAGRAPH

A. If a paragraph has no lexical or structural argument initializations then a label arg__init#NEW__PARAGRAPH is applied.

XII. "OR" RULE

A. Extracts the conjunctions "or" and "either" when they occur in the second column of the parse tree, and the node immediately following the conjunction is a verb phrase.

XIII. PARALLEL TERM RULE

A. Prevents the extraction of arg__init#Parallel lexical entries terms if they modify a verb or a noun at any level of embedding (cf also FIRST.DOC)

XIV. "SHOULD" RULE

A. The words, would, should, might, may, and could are be picked up for each essay. They are classified as arg__aux#SPECULATE in the lexicon.

B. These words occur in parse trees in the structure

C. AUXP VERB "__"

XV. "SO" RULE

A Extracts the conjunction so if it occurs initially in a subordinate clause or if it is a sentence-initial adverb.

XVI. "THEN" RULE

A. Extracts "then" if it occurs as an adverb or a conjunction that is not further embedded than the second column of the parse tree.

XVII. VERBING RULE

A. Extracts sentence-initial nouns and verbs ending in "-ing", as well as "-ing" verbs that immediately follow a prepositional phrase or an adverb that is in the second column of a parse tree. These extracted "-ing" words are labeled as arg__init#CLAIM__Ving if in the first or only sentence of a paragraph, and arg__dev#CLAIM__Ving otherwise.

B. If the base form of the verb is "do", then the label will be arg__dev#Inference.

XVII. "WHEN" RULE

A. Extracts all occurrences of "when" in the following structure

I. ABBCL* CONJUNCTION PHRASE* CONJUNCTION* "when" if this structure occurs no further embedded than the fourth column of the parse.

XIX. "WHILE" RULE

A. Extracts "while" under the following conditions.

1. It is the first constituent of a sentence
2. It is a conjuction in a subordinate clause that is not further embedded than the third column.

What is claimed is:

1. A method of grading an essay using an automated essay scoring system, the essay being a response to a test question, comprising:

(a) deriving a vector of syntactic features from the essay;

(b) deriving a vector of rhetorical features from the essay;

(c) deriving a first score feature from the essay;

(d) deriving a second score feature from the essay; and (e) processing the vector of syntactic features, the vector of rhetorical features, the first score feature, and the second score feature to generate a score for the essay.

2. The method of claim 1 further comprising the step of:

(f) creating a predictive feature set for the test question, wherein the predictive feature set represents a model feature set that is predictive of a range of scores for the test question, wherein in step (e), a scoring guide is derived from the predictive feature set and the score for the essay is assigned based on the scoring guide.

3. The method of claim 2, wherein the scores defined by said scoring guide are based on holistic scoring rubrics and range from 0 to 6.

4. The method of claim 2, wherein there is a batch of original essays which are essays of a known score to the test question and in the form of original electronic essay texts, and wherein step (f) of creating a predictive feature set comprises the steps of repeating steps (a) through (e) for the batch of original essays and processing the vector of syntactic features, the vector of rhetorical features, the first score feature, and the second score feature for each original essay using a linear regression to generate a predictive feature set for the test question.

5. The method of claim 1 wherein said step of deriving a vector of syntactic features from the essay comprises the following steps:

counting the number of different clause types for each sentence in the essay; and selecting one or more of said different clause types as predictive variables; and creating a vector of syntactic counts from the predictive variables.

6. The method of claim 5 wherein said step of counting the number of different clause types for each sentence in the essay comprises counting the number of at least the following clause types: compliment clauses, subordinate clauses, infinitive clauses, relative clauses and subjunctive modal auxiliary verbs.

7. The method of claim 5, wherein said method is used to grade an argument essay and said step of selecting one or more of said different clauses as predictive variables comprises selecting a total number of modal auxiliary verbs and a ratio of complement clauses per sentence as predictive variables.

8. The method of claim 5, wherein said method is used to grade an issue essay and said step of selecting one or more of said different clauses as a predictive variable comprises selecting a total number of infinitive clauses and a total number of modal auxiliary verbs per paragraph as predictive variables.

9. The method of claims 1, wherein said step of deriving a vector of rhetorical features from the essay comprises:

identifying an argument structure for each sentence in the essay; and counting the occurrences of selected argument predictive variables to create a vector of rhetorical features.

10. The method of claim 1, wherein said step of deriving a first score feature from the essay, comprises:

creating a list of words appearing in the essay;

creating a frequency vector identifying the frequency with which each word in said list of words appears in the essay;

creating for each of a plurality of score classes, each score class having a score class essay, a class frequency vector identifying the frequency with which each word appears in the class essay;

assigning a weight to each word in the frequency vector based on the salience of the word;

computing for each of the plurality of score class essays, a cosine correlation between the essay and the score class essay by comparing the frequency that particular words appear in the essay and the frequency that the same words appear in the score class essay; and selecting as the first score feature the score class having the highest correlation.

11. The method of claim 10, wherein said step of deriving a first score feature from the essay, further comprises applying a morphological analysis to the list of words appearing in the essay.

12. The method of claim 10, wherein the step of computing for each of the plurality of score classes a cosine correlation between the essay and each of the score class essays, comprises computing the following:

$$\Sigma(a_i * b_i)/\mathrm{sqrt}(\Sigma(a_i^2) * \Sigma(b_i^2))$$

where $a_i$ is the frequency of the word "i" in the essay and $b_i$ is the frequency of the word "i" in a particular score class essay.

13. The method of claim 1, wherein said step of deriving a second score feature from the essay, comprises:

generating argument partitioned text from the essay, said argument partitioned text comprising a structure identifier describing an aspect of the argument structure of the sentence;

for each of a plurality of score classes, each score class having a plurality of score class essays, creating a word weight vector for each of a set of argument words in the plurality of score class essays;

creating a word weight vector for each of a set of argument words in the essay;

computing for each of the set of argument words in the essay, a cosine correlation between the argument word weight vector for a particular argument word in the essay and the word weight vector for the same argument word in the plurality of score class essays;

assigning to each of the set of argument words in the essay the score class having the highest cosine correlation; and calculating an adjusted mean from the score classes assigned to each of the set of argument words.

14. The method of claim 13, wherein the step of creating a word weight vector for each of a set of argument words in the plurality of score class essays, comprises calculating the word weight vector using the following equation:

$$i\ W_{i,s} = (\mathrm{freq}_{i,s}/\mathrm{max\_freq}_s) * \log(n\_\mathrm{essays}_{total}/n\_\mathrm{essays}_i)$$

wherein $\mathrm{freq}_{i,s}$ is the frequency of argument word "i" in score class "s," $\mathrm{max\_freq}_s$ is the frequency of the most frequent argument word in score class "s," $n\_\mathrm{essays}_{total}$ is the total number of essays across the plurality of score classes, and $n\_\mathrm{essays}_i$ is the number of essays across the plurality of score classes containing word "i."

15. The method of claim 13, wherein the step of calculating an adjusted mean for the score classes assigned to each of the set of words comprises calculating the word weight vector-using the equation:

$$w_{i,a} = (\mathrm{freq}_{i,a} \mathrm{max\_freq}_a) * \log(n_{essaystotal}/n\_\mathrm{essays}_i)$$

wherein $\mathrm{freq}_{i,a}$ is the frequency of argument word "i" in argument "-a," $\mathrm{max\_freq}_a$ is the frequency of the most frequent argument word in score class "a," $n\_\mathrm{essays}_{total}$ is the total number of essays across the plurality of score classes, and $n\_\mathrm{essays}_i$ is the number of essays across the plurality of score classes containing word "i."

16. A computer readable storage device having computer executable instructions thereon for performing the steps recited in claim 1.

17. A system for automatically grading an essay, the essay being responsive to a test question, comprising:

a memory device; and a processor, wherein said processor is operable to execute instructions for performing the following:

(a) deriving a vector of syntactic features from the essay;

(b) deriving a vector of rhetorical features from the essay;

(c) deriving a first score feature from the essay;

(d) deriving a second score feature from the essay; and (e) processing the vector of syntactic features, the vector of rhetorical features, the first score feature, and the second score feature to generate a score for the essay.

\* \* \* \* \*

UNITED STATES PATENT AND TRADEMARK OFFICE
CERTIFICATE OF CORRECTION

PATENT NO.   : 6,366,759 B1
DATED        : April 2, 2002
INVENTOR(S)  : Burstein et al.

It is certified that error appears in the above-identified patent and that said Letters Patent is hereby corrected as shown below:

Column 6,
Line 14, (Table 3), please delete "an" and insert therefor -- on --;
Lines 15, 16 & 17, please delete "therewas" extensivenationalpublicity" of the womanduringthattime." and insert therefor -- there was "extensive national publicity of the woman during that time. --;

Column 8,
Line 27, please delete "$max_{13}$" and insert therefor -- $max\_$ --;

Column 11,
Line 16, please delete "if only" and insert therefor -- if_only --;
Line 47, please delete "furhermore" and insert therefor -- furthermore --;

Column 12,
Line 48, please delete "Constains" and insert therefor -- Constrains --;
Line 55, please delete "asbordite" and insert therefor -- a subordinate --;
Line 61, please delete "constitent" and insert therefor -- constituent --;

Column 13,
Line 6, please delete "Infintival" and insert therefor -- Infinitival --;

Column 14,
Line 50, please delete "claims" and insert therefor -- claim --;

UNITED STATES PATENT AND TRADEMARK OFFICE
CERTIFICATE OF CORRECTION

PATENT NO. : 6,366,759 B1
DATED : April 2, 2002
INVENTOR(S) : Burstein et al.

It is certified that error appears in the above-identified patent and that said Letters Patent is hereby corrected as shown below:

<u>Column 16,</u>
Line 6, please delete first occurrence of "i";
Line 18, please delete "$w_{i,a}=(freq_{i,a}max\_freq_a)*log(n_{essaystotal}/n\_essays_i)$" and insert therefor -- $w_{i,a}=(freq_{i,a}/max\_freq_a)*log(n\_essays_{total}/n\_essays_i)$ --;
Line 21, please delete "_a," and insert therefor -- a, --.

Signed and Sealed this

Fourth Day of February, 2003

JAMES E. ROGAN
*Director of the United States Patent and Trademark Office*